US010412717B2

(12) United States Patent
Fodor et al.

(10) Patent No.: US 10,412,717 B2
(45) Date of Patent: Sep. 10, 2019

(54) MANAGEMENT OF D2D-RELATED INTERFERENCE

(71) Applicant: Telefonaktiebolaget LM Ericsson (publ), Stockholm (SE)

(72) Inventors: Gabor Fodor, Hässelby (SE); Chrysostomos Koutsimanis, Stockholm (SE); Govardhan Madhugiri Dwarakinath, Vällingby (SE); Per Skillermark, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

(21) Appl. No.: 15/113,476

(22) PCT Filed: Jan. 23, 2014

(86) PCT No.: PCT/SE2014/050083
§ 371 (c)(1),
(2) Date: Jul. 22, 2016

(87) PCT Pub. No.: WO2015/112065
PCT Pub. Date: Jul. 30, 2015

(65) Prior Publication Data
US 2017/0026939 A1    Jan. 26, 2017

(51) Int. Cl.
*H04W 4/00* (2018.01)
*H04W 72/04* (2009.01)
(Continued)

(52) U.S. Cl.
CPC ......... *H04W 72/042* (2013.01); *H04L 5/0073* (2013.01); *H04W 72/0406* (2013.01); *H04W 72/082* (2013.01); *H04L 5/005* (2013.01)

(58) Field of Classification Search
CPC ...... H04W 72/04; H04W 88/08; H04W 76/00
See application file for complete search history.

(56) References Cited

U.S. PATENT DOCUMENTS

2009/0325625 A1* 12/2009 Hugl ..................... H04W 52/16
455/522
2012/0051315 A1    3/2012 Wang et al.
(Continued)

FOREIGN PATENT DOCUMENTS

WO    WO-2013067685 A1 *  5/2013  ............ H04W 24/10
WO    2013108135 A1    7/2013

OTHER PUBLICATIONS

Fodor, Gábor et al., "Design Aspects of Network Assisted Device-to-Device Communications", IEEE Communications Magazine, vol. 50, Issue 3, Mar. 2012, 170-177.

Primary Examiner — Siren Wei
(74) Attorney, Agent, or Firm — Sage Patent Group

(57) ABSTRACT

A system, comprising a base station and a wireless device, is provided for managing reference signal interference in a wireless communication system allowing device-to-device, D2D, communication. The base station and the wireless device and methods therein are described. The method in the wireless device comprises receiving an indication, from a base station, of downlink transmission resources that are associated with D2D communication in a cell associated with the BS during at least a time period T. The method further comprises determining based on the received indication, downlink reference signals that may be subjected to interference, caused by D2D communication, when performing reference signal measurements during at least the time period T. The method further comprises excluding or reducing 403 the influence of said downlink reference signals when performing reference signal measurements during at least the time period T.

27 Claims, 6 Drawing Sheets

(51) Int. Cl.
*H04W 72/08* (2009.01)
*H04L 5/00* (2006.01)

(56) References Cited

U.S. PATENT DOCUMENTS

| | | | |
|---|---|---|---|
| 2012/0250636 A1* | 10/2012 | Wang | H04W 72/08 |
| | | | 370/329 |
| 2013/0294296 A1 | 11/2013 | Dimou et al. | |
| 2014/0235234 A1* | 8/2014 | Jang | H04W 36/18 |
| | | | 455/426.1 |
| 2014/0241219 A1* | 8/2014 | Patil | H04W 72/02 |
| | | | 370/280 |
| 2014/0328329 A1* | 11/2014 | Novlan | H04W 72/042 |
| | | | 370/336 |

* cited by examiner

MANAGEMENT OF D2D-RELATED INTERFERENCE

TECHNICAL FIELD

The solution described herein relates generally to interference in a wireless communications system, and in particular to interference to downlink reference signals caused by device-to-device, D2D, communication within the system.

BACKGROUND

Allowing and enabling D2D communications within a wireless cellular communication system associated with a frequency spectrum increases the degree of utilization of the frequency spectrum. The reason for this is that a pair of UEs communicating in D2D mode may reuse the frequency spectrum resources, such as the physical resource blocks, PRBs, of a 3GPP Long Term Evolution, LTE, system. When D2D communications use the downlink, DL, resources of a cellular communication system, existing radio resource management techniques can protect the PRBs used for DL cellular transmissions of user data or DL control information transmitted on DL control channels. In this way, user specific reference signals, like the demodulation reference signals, DMRSs, used for demodulation, which are transmitted within the same PRBs as the user data are automatically protected as well. Such techniques are possible since in cellular integrated D2D communications, the base station, e.g. the eNB, schedules and/or grants access to resources used for both D2D and for cellular transmissions within the system. In general, existing techniques that manage and coordinate resource allocation for the D2D and cellular layers focus on the user data resources and typically assume that only a small subset of the available PRBs are used by a specific D2D pair at a time.

Existing methods allow the base station or cellular access point to select the set of downlink or uplink cellular resources that should be used for D2D communication by a specific D2D pair, i.e. two devices engaged in D2D communication with each other. Dynamically determining the set of UL or DL resources that should be used for D2D communication is useful, because it can make underutilized cellular resources available for D2D communications, while protecting highly utilized cellular resources. For example, in certain situations DL resources can be highly loaded, while in other deployment scenarios, the UL resources can be the bottleneck of a cellular system.

However, even though user data sent between a base station and a user equipment may be protected in the presence of D2D communication, D2D communication within a cellular communication system may still introduce problems related to interference. The problem which has been realized by the inventors, and which will be discussed herein is the problem of D2D communication creating interference to reference signals transmitted from a base station for use by UEs. Such reference signals may herein be referred to e.g. as "cellular reference signals" or "DL reference signals".

Different strategies are employed in wireless networks for the arrangements of reference signals in the time-, frequency- code- and antenna port domains. For example, in orthogonal frequency division multiplexing, OFDM, systems, reference signals in terms of utilizing specific subcarriers or time instances may be arranged in the time and frequency domains according to the so called block type, comb type or some other patterns, such as that shown in FIG. 1.

The exact pattern of the RSs in time and frequency can be optimized for different objectives and it also affects how the receiver of the RS, e.g. a cellular UE, can use time and frequency domain, or a combination of these, interpolations to estimate the actual channel state information, CSI for demodulation or other purposes. For example, a UE may weigh in RS measurements from the past or in other frequencies than at which the actual CSI is needed at a given point in time.

Existing technology provides no means to protect DL reference signals from interference from D2D communication when the D2D communication uses DL resources. Further, according to existing technology, UEs measuring or otherwise using the cellular reference signals do not take into account that some of the reference signals are subjected to interference from, or contaminated by, intra cell D2D transmissions. For example, in FIG. 2, cellular UE1 and UE2 may measure on cellular DL reference signals embedded in PRB1 and PRB2 that are interfered by D2D transmissions (D2D Tx 1 and Tx 2 respectively).

Existing techniques provide means to protect the user data of UE-1 and UE-2, by, for example, avoiding use of PRB-1 and PRB-2 for cellular traffic in general, or avoiding sending data to UE-1 and UE-2 using these resource blocks. In either case, the existing techniques do not address the problem of UE-1 and UE-2 using reference signals embedded in resource elements of PRB-1 and PRB-2.

This problem becomes particularly pronounced when the cellular system reallocates cellular resources that are made available for D2D traffic. For example, if the cellular BS decides to use UL resources for D2D traffic, but later it decides to switch to using DL resources for D2D traffic, DL measurements by cellular UEs may suddenly become heavily interfered by D2D traffic.

SUMMARY

It would be desirable to achieve reliable UE measurements on reference signals, and thus to obviate or mitigate errors in UE measurements. It is an object of the herein presented solution to obviate or mitigate the influence of D2D interference on UE measurements on downlink reference signals.

According to a first aspect, a method is provided, which is to be performed by a base station operable in a wireless communication system allowing D2D communication. The method comprising determining downlink transmission resources that are to be associated with D2D communication, in a cell associated with the BS, during at least a time period T. The method further comprises indicating the determined transmission resources to one or more wireless devices, thus informing the one or more wireless devices of downlink reference signals that may be subjected to interference from D2D communication.

According to a second aspect, a method is provided, which is to be performed by a wireless device operable in a wireless communication system which allows D2D communication. The method comprising receiving an indication, from a base station, of downlink transmission resources that are associated with D2D communication in a cell associated with the BS during at least a time period T. The method further comprises determining based on the received indication, downlink reference signals that may be subjected to interference, caused by D2D communication, when performing reference signal measurements during at least the time period T. The method further comprises excluding or reducing 403 the influence of said downlink reference signals when performing reference signal measurements during at least the time period T.

According to a third aspect, a base station is provided, which is operable in a wireless communication system allowing D2D communication. The base station comprises processing means, such as e.g. a processor and a memory comprising executable instructions, which renders the base station operative to determine downlink transmission resources that are to be associated with D2D communication, in a cell associated with the BS, during at least a time period T. The base station is further rendered operative to indicate the determined transmission resources to one or more wireless devices, thus informing the one or more wireless devices of downlink reference signals that may be subjected to interference from D2D communication.

According to a third aspect, a wireless device is provided, which is operative in a wireless communication system allowing D2D communication. The wireless device comprises processing means, such as e.g. a processor and a memory comprising executable instructions, which renders the wireless device operative to receive an indication, from a base station, of downlink transmission resources that are associated with D2D communication in a cell associated with the BS during at least a time period T. The wireless device is further rendered operative to determine, based on the received indication, downlink reference signals that may be subjected to interference, caused by D2D communication, when performing reference signal measurements during at least the time period T. The wireless device is further rendered operative to exclude or reduce the influence of said downlink reference signals when performing reference signal measurements during at least the time period T.

According to a fifth aspect, a system is provided for managing reference signal interference in a wireless communication system allowing device-to-device, D2D, communication. The system comprises a base station according to the third aspect and a wireless device according to the fourth aspect. Further, computer programs are provided, which when run in the nodes/devices mentioned above causes the nodes/devices to perform the methods mentioned above.

BRIEF DESCRIPTION OF THE DRAWINGS

The foregoing and other objects, features, and advantages of the solution disclosed herein will be apparent from the following more particular description of embodiments as illustrated in the accompanying drawings. The drawings are not necessarily to scale, emphasis instead being placed upon illustrating the principles of the solution disclosed herein.

DETAILED DESCRIPTION

Herein, it is referred to device-to-device, D2D communication. By D2D communication is here meant direct communication between two devices, which are also operable for uplink and/or downlink communication with a base station. A device operating in D2D mode may herein be referred to e.g. as a "D2D wireless device" or a "D2D UE". A device operating in a "normal" cellular system communication mode comprising uplink and/or downlink communication may herein be referred to e.g. as a "cellular wireless device" or "cellular UE".

The herein proposed solution requires introduction of new signaling as compared to previously known solutions. Thus, the herein proposed solution is applicable for wireless devices and base stations which are operable for such signaling. As the resources, e.g. PRBs, used for the D2D transmissions or mode selection pilot is known, in fact determined, by the network, the network may inform or otherwise configure cellular wireless devices such that reference signals e.g. CRSs comprised within these PRBs are excluded from any wireless device measurements, or at least such that the influence of certain reference signals comprised within these resources on any wireless device measurements is reduced. This is achieved by means of new signaling.

In addition, the base station, e.g. eNB, may signal information to D2D wireless devices at the time, or subsequently, when resources are granted for the D2D link regarding whether those resources are reserved exclusively for the specific D2D pair, i.e. if they are non-shared resources, or if they are reused by the cellular layer and the specific D2D pair, or reused by a plurality of D2D pairs but not by cellular users, etc. Such information can then be used by the wireless devices to, for example, exclude RS measurements on RSs in such resources. Alternatively, the wireless devices may still try to determine the CSI on such resources, but take such BS signaled information into account in its interpolation algorithm.

In the following paragraphs, different aspects of the solution disclosed herein will be described in more detail with references to certain embodiments and to accompanying drawings. For purposes of explanation and not limitation, specific details are set forth, such as particular scenarios and techniques, in order to provide a thorough understanding of the different embodiments. However, other embodiments may depart from these specific details.

Figure 1:
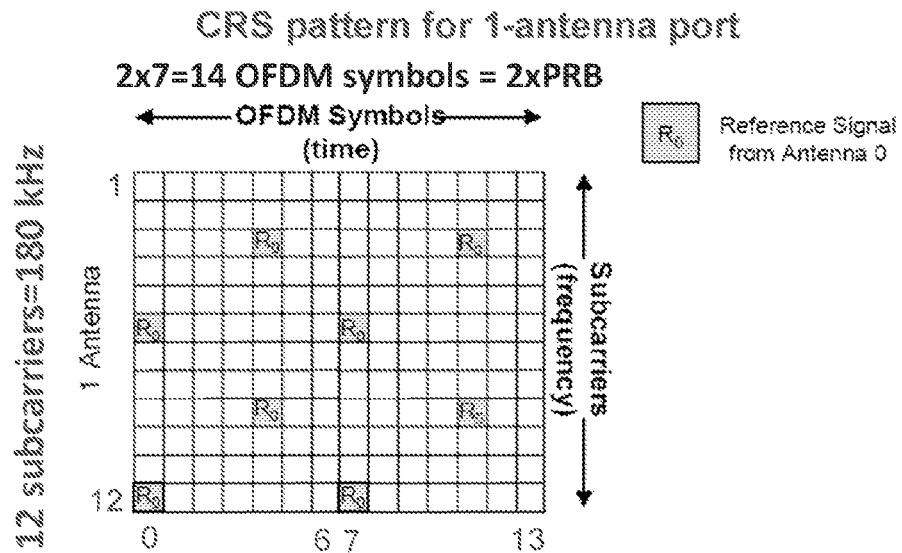
FIG. 1 shows a physical resource block, PRB, pair and a cell reference signal, CRS pattern for one antenna port.
Figure 2:
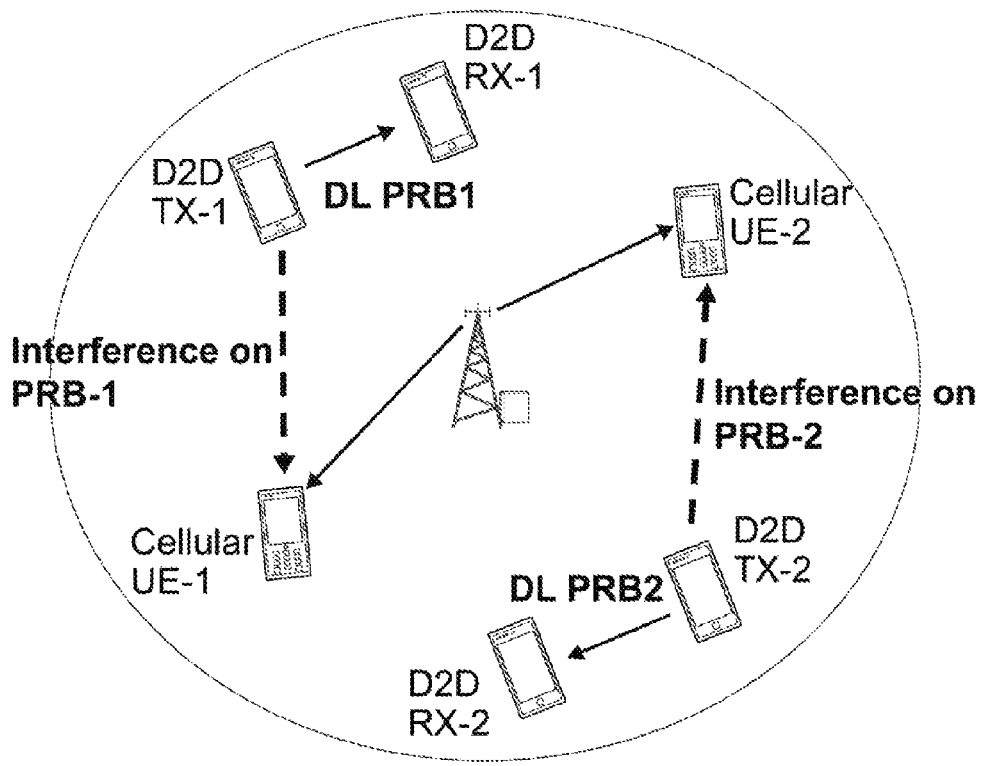
FIG. 2 illustrates devices involved in D2D communication and devices involved in cellular communication with a base station, and the possible interference from D2D communication.
Figure 3:
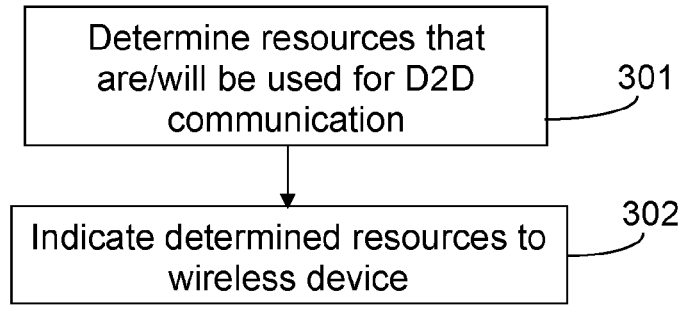
FIG. 3 is a flow chart illustrating procedure in a BS, according to an exemplifying embodiment.

Exemplifying Method Performed by a Base Station, FIG. 3

An exemplifying method performed by a base station, BS, will be described below with reference to FIG. 3. The base station is operable in a wireless communication system allowing device-to-device, D2D, communication. The BS may be a radio base station, RBS, such as an LTE eNB, an access node or a relay. An access node could alternatively be denoted e.g. access point. A radio base station could alternatively be denoted eNodeB, NodeB or something else, depending e.g. on preferred terminology and/or radio access technology.

FIG. 3 illustrates the method comprising determining, 301, downlink transmission resources that are to be associated with D2D communication, in a cell associated with the BS, during at least a time period T. The method further comprises indicating, 302, the determined transmission resources to one or more wireless devices, thus informing the one or more wireless devices of downlink reference signals that may be subjected to interference from D2D communication.

As previously mentioned, D2D communication here implies direct communication between devices, as opposed to communication between a base station and a wireless device. The D2D communication takes place within a frequency spectrum that is also used for downlink communication between a base station and at least one wireless device in a cellular communication system. The amount of transmission resources associated with D2D communication may vary, and may be selectively distributed in time and frequency. The base station should be able to indicate the position or positions in time and frequency of the transmission resources to a UE. This is especially important in the frequency domain, since in UE channel measurements, an average is typically calculated for measurements on reference signals in different frequency resources at the same point in time. Therefore, a deviating, due to D2D interference, measurement result, e.g. in a certain PRB, would affect the channel measurement result related to reference signals in other frequency resources, which is normally not the case for the time domain.

The D2D communication is assumed to be integrated with the cellular communication system, that is, the BS allocates and schedules resources for both the D2D communication and the downlink communication.

When the base station is responsible for allocation of transmission resources both to D2D communication and downlink, DL, cellular communication, the base station may continuously keep track of the DL transmission resources, e.g. PRBs, that are currently used for, or granted for, D2D communication. By DL transmission resources is meant transmission resources which are defined as DL resources for the cellular communication, which communication may alternatively be denoted e.g. "non-D2D communication".

Figure 5:
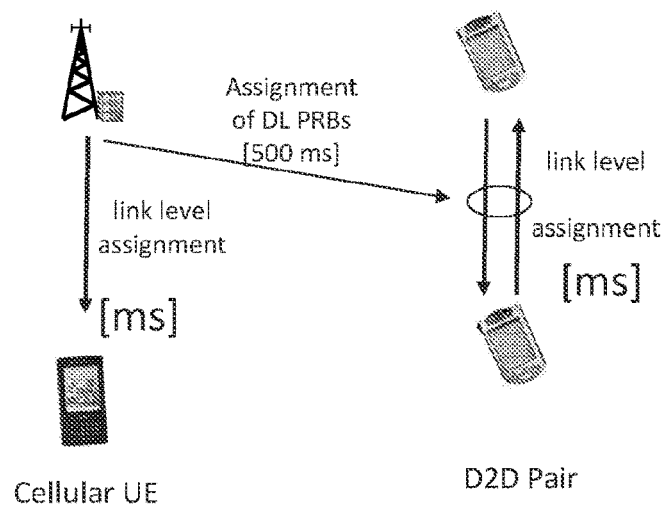
FIG. 5 illustrates transmission resource assignment performed by a base station.

The BS, e.g. eNB in case of LTE, may thus keep track of which DL transmission resources, e.g. PRBs, that are used for D2D communication by different D2D pairs in a cell associated with the BS. This is practically feasible, since the D2D transmission resource assignment, at least in LTE, is typically done at a coarse time scale, as compared to resource assignment for cellular communication. This is illustrated in FIG. 5, which shows the different time scales, where link level assignment is performed on a scale of few ms, and the assignment of resources to D2D communication is performed on a larger scale of hundreds of ms, e.g. 500 ms.

The base station may e.g. maintain a table in which the DL transmission resources that are currently assigned for D2D communication are listed or stored. Further, in such a table, data associated with such DL transmission resources may be kept or stored. For example, the maximum D2D transmit power that the BS has granted for the D2D pair to use specifically on a certain transmission resource, e.g. PRB, may be stored. Furthermore, the base station may also identify if the D2D pair is in the cell edge or not. Also, the base station can keep track of whether the particular transmission resource/PRB is used by multiple D2D pairs and/or by cellular wireless devices. That is, the actual or maximum reuse factor of a given transmission resource. This will be further described below.

Such a table or record may be reconfigured e.g. when the BS changes resource allocation mode. That is, when changing the set of resources that are available for D2D communications, e.g. from/to an UL set of resources to/from a DL set of resources; or a change of DL resources.

Thus, the determining 301 may comprise deriving, based on information in such a table, a set of DL transmission resources, in time and frequency, that are associated with D2D communication. The determined set may be dynamic, i.e. may change over time, as previously mentioned. Therefore, it is expressed herein that the set of DL transmission resources are associated with D2D communication during at least a time period T, where the time period T may be e.g. until the next reconfiguration of the table, or, until the next D2D transmission resource assignment, e.g. 500 ms, or some other appropriate time period, after which the set of DL transmission resources may be changed.

The indicating may be performed to one or more wireless devices, e.g. to all wireless devices in a cell, or to a selected subset of the wireless devices in the cell; e.g. to wireless devices in a certain part of the cell; and/or to wireless devices served in certain time and/or frequency resources. The indicating of the determined resources to a wireless device may be done in different ways, which will be further described below.

As previously mentioned, the communication system may be of LTE-type, and the transmission resources may be determined and/or indicated in terms of Physical Resource Blocks, PRBs, which are defined within the LTE standard. A PRB is composed of 7 OFDM symbols in the time domain and 12 subcarriers (180 kHz) in the frequency domain. For other types of communication systems, the transmission resources may be grouped and denoted differently.

One possibility is that all transmission downlink resources associated with any D2D communication in a cell are determined and indicated to one or more wireless devices. Alternatively, or in addition, a set of downlink transmission resources associated with a certain D2D communication, or a certain type of D2D communication, may be determined and indicated to the one or more wireless devices. For example, the transmission resources associated with D2D communication with a maximum allowed transmit power which exceeds a threshold, or compares unfavorably with a threshold, may be determined and indicated. Alternatively, or in addition, transmission resources associated with D2D communication using a transmit power over a certain level or threshold may be indicated. That is, the transmission resources associated with D2D communication which can, or is likely to, create substantial interference to cellular wireless devices may be determined and indicated, while transmission resources associated with D2D communication which is expected to create negligible interference may be ignored.

The transmission resources may be indicated to the one or more wireless devices via downlink physical control channel, PDCCH, signaling; via radio resource control, RRC, signaling; and/or via broadcast signaling.

For wireless devices in a connected mode, a message over a downlink control channel may be used to indicate the transmission resources. In such a signaling message, the base station may include other data associated with the transmission resources; such as the time interval that the transmission resources are, or will continue to be, allocated for D2D traffic; the maximum transmit power allowed to be used by a D2D pair and/or a flag indicating that the transmission resources may be used by multiple D2D pairs in the cell. This latter parameter is especially useful in systems in which a transmission resource, such as a PRB, may be reused by multiple D2D pairs in a cell. Alternatively the transmission resources may be indicated using RRC signaling to wireless devices in connected mode. Also here, additional information may be included in the signaling.

Alternatively, or in addition, the transmission resources could be indicated or signaled to one or more wireless devices via broadcast signaling on a broadcast channel. Such broadcast signaling may have a low periodicity, e.g. in the order of 1000 ms or more. The indicating or signaling may e.g. identify a list of transmission resources or an interval of transmission resources. An advantage of using broadcast signaling is that also cellular wireless devices that are in idle mode may receive the indicated information, e.g. list. Wireless devices in idle mode or other unconnected modes typically perform continuous measurements on downlink reference signals for, e.g., cell reselection purposes. For such wireless devices it may thus be crucial to know which downlink transmission resources that are currently used by D2D traffic, in order to perform accurate idle mode mobility measurements.

As mentioned above, other, associated, information may be indicated or signaled to the one or more wireless devices, in addition to the identified transmission resources. For example, the time period T and/or a maximum transmit power allowed to be used for D2D communication by each pair of devices engaged in D2D communication. Further, transmission resources that are associated with multiple pairs of devices engaged in D2D communication may be identified. Further, the BS could indicate a type of reference signal that is protected from D2D interference; and/or a type of reference signal that should be excluded or be given reduced influence during channel measurements and during channel state interpolation algorithms. That is, the BS could signal, to the one or more wireless devices, which type/s of RSs that should e.g. be included or excluded in the wireless device measurements during the on-going/subsequent mode selection, MS, period. For example, the BS can instruct the wireless devices to continue to measure on wireless device specific RSs but not on cell specific RSs.

The BS may further indicate the determined transmission resources to a neighboring BS, thus informing the neighboring BS of which downlink reference signals that may be subjected to inter-cell-interference caused by D2D communication.

For example, if the BS identifies a D2D pair as a "cell edge D2D pair", the eNB may use e.g. X2 or S1 signaling to indicate to a neighbor BS that the coinciding DL reference signals in a cell associated with the neighbouring BS may be interfered by cell edge D2D transmissions. Alternatively, the BS may only send such X2 or S1 messages to one or more neighbor BSs e.g. if the D2D pair is allowed to use higher transmit power level than a certain threshold. The terms X2 and S1 are mainly used in LTE, where X2 denotes a type of interface between two base stations, eNBs, and S1 denotes a type of interface between a base station, eNB, and a network node, such as a Mobility Management Entity, MME.

When a BS receives signaling indicating such neighbor D2D activity, the BS may indicate the transmission resources in question to one or more wireless devices in the cell, e.g. wireless devices close to the neighboring cell. Then, the determining of downlink transmission resources could further be based on the received indication from the neighbor BS. This way, the BS may help its served or camping UEs to form more accurate CRS based measurements than they would do without such inter-cell signaling information.

Figure 4:
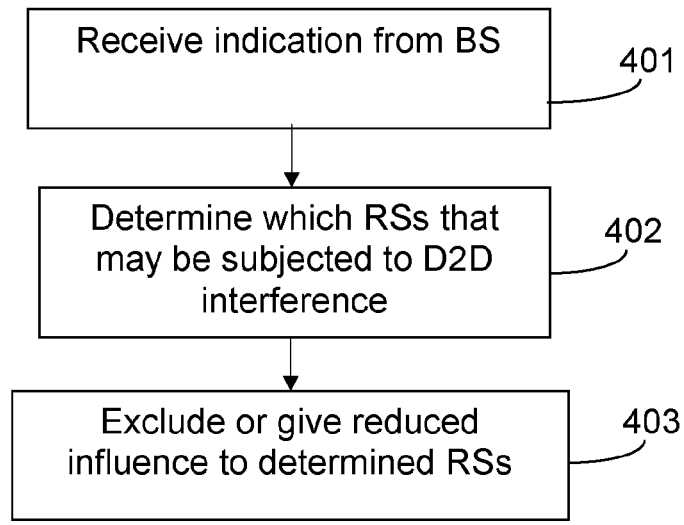
FIG. 4 is a flow chart illustrating procedure in a wireless device, according to an exemplifying embodiment.

Exemplifying Method Performed by a Wireless Device, FIG. 4

An exemplifying method performed by a wireless device will be described below with reference to FIG. 4. The method performed by the wireless device corresponds to the method performed by a base station described above. The wireless device is operable in a wireless communication system which allows D2D communication. The method is suitable for managing reference signal interference in the wireless communication system. The wireless communication system may be e.g. LTE or High Speed Packet Access (HSPA) or a Wideband Code Division Multiple Access (WCDMA) system The wireless device may be e.g. a UE, such as an LTE UE, a sensor, an actuator, a communication device, a tablet, a computer or any other device capable of wireless communication and operable in the wireless communication system. The wireless device is one of the one or more wireless devices mentioned above when describing the method performed by a base station.

FIG. 4 illustrates the method comprising receiving 401 an indication, from a base station, of downlink transmission resources that are associated with D2D communication in a cell associated with the BS during at least a time period T. The method further comprises determining, 402, based on the received indication, downlink reference signals that may be subjected to interference, caused by D2D communication, when performing reference signal measurements during at least the time period T. The method further comprises excluding or reducing 403 the influence of said downlink reference signals when performing reference signal measurements during at least the time period T.

The received indication is an indication transmitted from a base station as the one described above. It may comprise a representation of downlink transmission resources associated with D2D communication in the cell in which the wireless device is located. The representation could be e.g. a list of transmission resources, one or more intervals of transmission resources or an abstraction of transmission resources.

The received indication is used to identify the downlink resources, e.g. PRBs, whose resource elements may be interfered or severely interfered by D2D transmission. The wireless device is assumed to have knowledge of in which downlink transmission resources different reference signals are allocated. This may also be realized by the fact that the wireless device should know the location of the reference signals in order to be able to perform measurements on the reference signals. Thus, the wireless device may determine, identify or decide which reference signals that are located within the indicated downlink transmission resources, and may thus consider or treat these reference signals in a special way. The reference signals, which occur in transmission resources which are also used for D2D communication, may be unreliable due to that they may be subjected to D2D interference. Measurements performed on reference signals subjected to severe D2D interference give results which are unreliable as base for decisions regarding e.g. the state of the channel.

Reference signals which risk to be subjected to D2D interference could be handled in different ways. One alternative is to exclude such reference signals from any measurements, i.e. no measurements are performed on these reference signals. Another alternative is to reduce the influence of such reference signals, e.g. assigning a low weight to measurements related to these reference signals, such that they do not influence or contribute as much to a total measurement result.

A wireless device that excludes a transmission resource from its measurements can still try to estimate the downlink channel state information, e.g. the complex channel coefficient, in order to be able to demodulate transmitted information/symbols on a channel associated with the transmission resource. In this case, the wireless device may take the received indication into account in its algorithm by means of which it uses measurements on other reference signals and existing interpolation techniques. For example, if the wireless device receives information that a PRB2 is used by multiple D2D pairs and the wireless device excludes reference signal measurements on PRB2, it may use interpolation techniques and measurements on PRB1 and PRB3 to estimate the channel state information, CSI, associated with PRB2.

The received indication may indicate transmission resources associated with any D2D communication. Alternatively, or in addition, the received indication may indicate transmission resources associated with a certain D2D communication or a certain type of D2D communication, such as D2D communication with a maximum allowed transmit power which exceeds a threshold; D2D communication using a transmit power which exceeds a threshold or D2D communication in a certain part of a cell. The wireless device may use this information to autonomously decide e.g. whether CRS measurements should be done on these transmission resources or not.

For example, transmission resources which are associated with low power D2D communication might not be included amongst the indicated transmission resources, or, if they are included, the wireless device may still decide to use reference signals in these transmission resources for performing measurements. The reason for leaving out such resources or continuing to measure on reference signals within such resources would be a conclusion or decision that the interference caused by the D2D communication in these transmission resources is negligible or close to negligible. Thus, one alternative is to only, or in addition to indicating all transmission resources associated with any D2D communication, indicate transmission resources associated with a D2D communication which is likely to cause severe interference, e.g. which uses a high transmission power, or similar.

The indication may be received from the base station via PDCCH signaling; RRC signaling or broadcast, as previously mentioned.

Further, indications of other information may be received from the base station. For example, an indication of the time period T could be received, and/or of the maximum transmit power allowed to be used for D2D communication by each pair of devices engaged in D2D communication. Further or in addition, an indication of resources that are associated with multiple pairs of devices engaged in D2D communication may be received, and/or of a type of reference signal that is protected from D2D interference; and/or of a type of reference signal that should be excluded or be given reduced influence during channel measurements.

The time period T could be used by the wireless device to determine for at least how long it should exclude a set of reference signals from measurements before evaluating whether the set of transmission resources associated with D2D communication has not been changed. The information on maximum allowed transmit power and resources associated with multiple D2D pairs may be used by the wireless device to determine which reference signals that are most likely to be subjected to D2D interference, e.g. being the reference signals coinciding with the high power D2D communication or multiple D2D pair communication.

A received indication of a type of reference signal that is protected from D2D interference could be used for determining that measurements should be performed on such reference signals, even though they are located within the transmission resources associated with D2D communication. That is, some parts of the indicated transmission resources may still be reserved for the reference signals, such as certain resource elements within a PRB. A received indication of a type of reference signal that should be excluded or be given reduced influence during channel measurements may be used as marking a change, e.g. the end of a period where the type of reference signal has been protected from interference. Alternatively the received indication of a type to e.g. exclude, could be used for concluding e.g. that all other types of reference signals within the transmission resources associated with D2D communication should be used for measurements.

Figure 6:
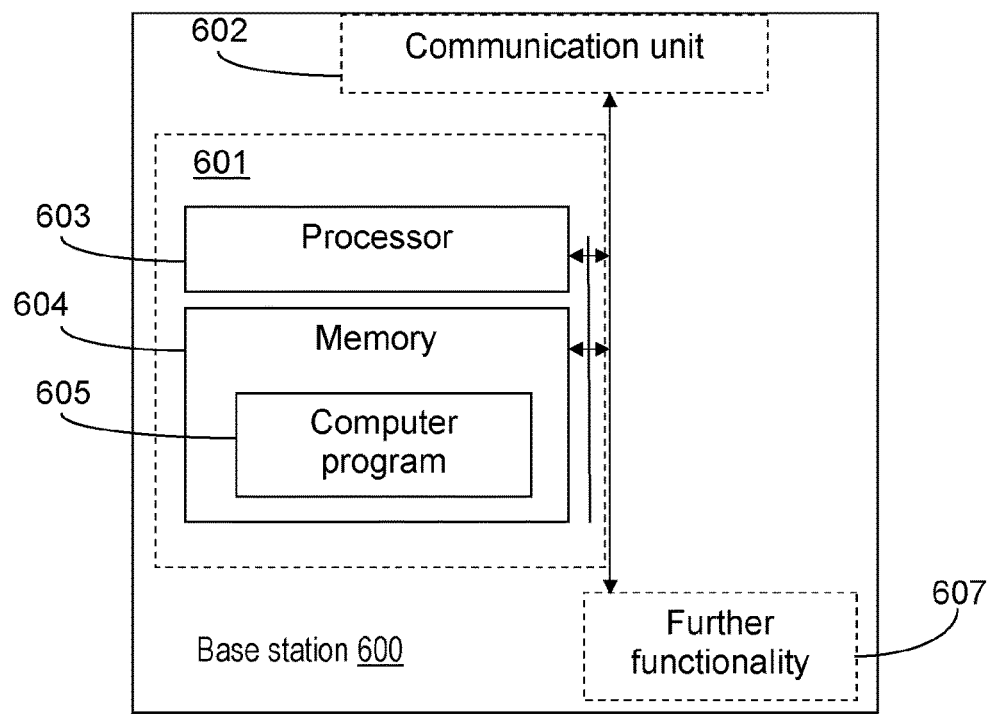
FIGS. 6 and 7 are block charts, illustrating a BS, according to different exemplifying embodiments.

Exemplifying Base Station, FIG. 6

Embodiments described herein also relate to a base station operable in a wireless communication system allowing D2D communication. The base station is adapted to perform at least one embodiment of the method described above. The base station is associated with the same technical features, objects and advantages as the method described above. The base station may be a radio base station, RBS, such as eNB, a NodeB, an access node and/or a relay, which is operable in one or more wireless communications systems, such as an LTE-type system, a WCDMA system or a multi-RAT (radio access technology) system. The base station will be described in brief in order to avoid unnecessary repetition.

Below, an exemplifying base station 600, adapted to enable the performance of the above described procedure performed by a base station, will be described with reference to FIG. 6.

The part of the base station which is mostly related to the herein suggested solution is illustrated as an arrangement 601 surrounded by a broken/dashed line. The arrangement 601 and possibly other parts of the base station 600 are adapted to enable the performance of one or more of the methods or procedures described above and illustrated e.g. in FIG. 3.

The base station illustrated in FIG. 6 comprises processing means, in this example in form of a processor 603 and a memory 604, wherein said memory is containing instructions 605 executable by said processor, whereby the base station is operative to perform the method described above. That is, the execution of the instruction renders the base station operative to determine downlink transmission resources that are to be associated with D2D communication, in a cell associated with the BS, during at least a time period T. The base station is further rendered operative to indicate the determined transmission resources to one or more wireless devices, thus informing the one or more wireless devices of downlink reference signals that may be subjected to interference from D2D communication.

The downlink transmission resources may be indicated as a set of Physical Resource Blocks, PRBs.

The determined downlink transmission resources may be associated with at least one of: D2D communication with a maximum allowed transmit power which exceeds a threshold; D2D communication using a transmit power which exceeds a threshold; any D2D communication; and D2D communication in a certain part of a cell.

The transmission resources may be indicated to the one or more wireless devices via PDCCH signaling; RRC signaling and/or broadcast signaling.

The base station may further be rendered operative to indicate, to the one or more wireless devices, one or more of: the time period T; the maximum transmit power allowed to be used for D2D communication by each pair of devices engaged in D2D communication, resources that are associated with multiple pairs of devices engaged in D2D communication; a type of reference signal that is protected from D2D interference; and a type of reference signal that should be excluded or be given reduced influence during channel measurements.

The base station may further be rendered operative to indicate the determined transmission resources to a neighboring BS, thus informing the neighboring BS of downlink reference signals that may be subjected to inter cell interference caused by D2D communication. The determined transmission resources may be indicated to the neighboring BS via an X2 or S1 interface.

The base station 600 is illustrated as to communicate with other entities via a communication unit 602, which may be considered to comprise conventional means for wireless and/or wired communication in accordance with a communication standard within which the base station is operable. The arrangement and/or base station may further comprise other functional units 607, for providing e.g. regular base station functions, such as e.g. signal processing, coding and scheduling.

Figure 7:
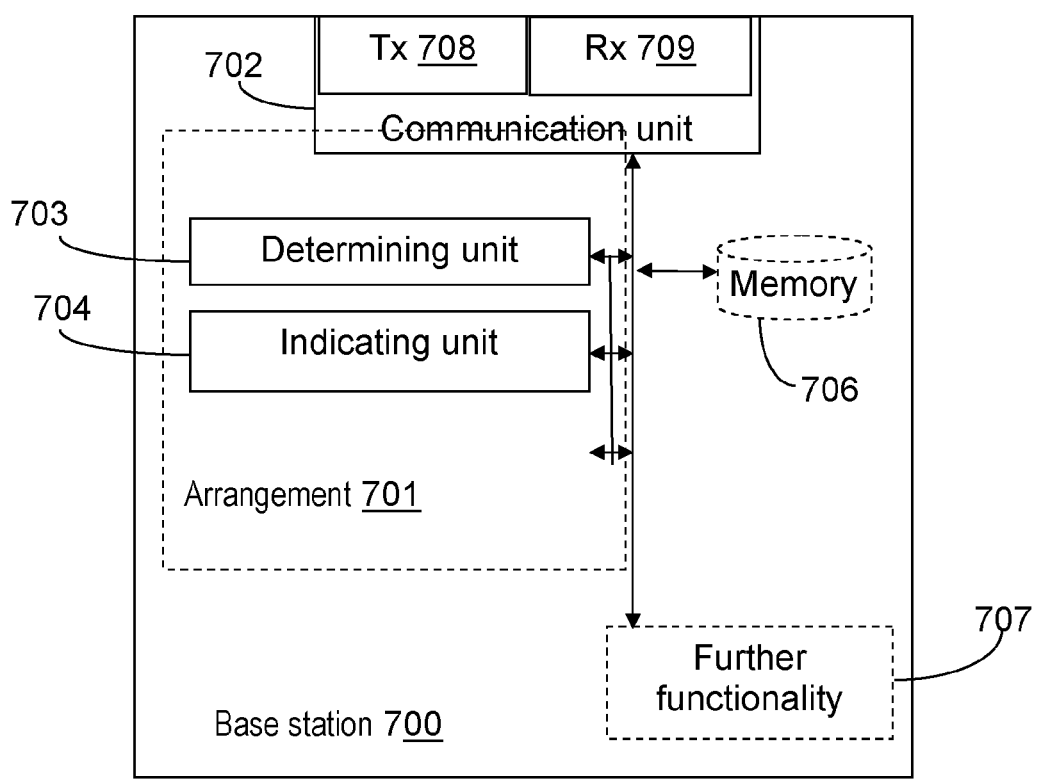

The arrangement 601 may alternatively be implemented and/or schematically described as illustrated in FIG. 7. The arrangement 701 comprises a determining unit 703 for determining downlink transmission resources that are associated with D2D communication in a cell associated with the BS during at least a time period T. The base station further comprises an indicating unit 704 for indicating the determined transmission resources to one or more wireless devices, thus informing the one or more wireless devices of downlink reference signals that may be subjected to interference from D2D communication.

The arrangement 701, and other parts of the base station could be implemented e.g. by one or more of: a processor or a micro processor and adequate software and storage therefore, a Programmable Logic Device (PLD) or other electronic component(s)/processing circuit(s) configured to perform the actions mentioned above.

Figure 8:
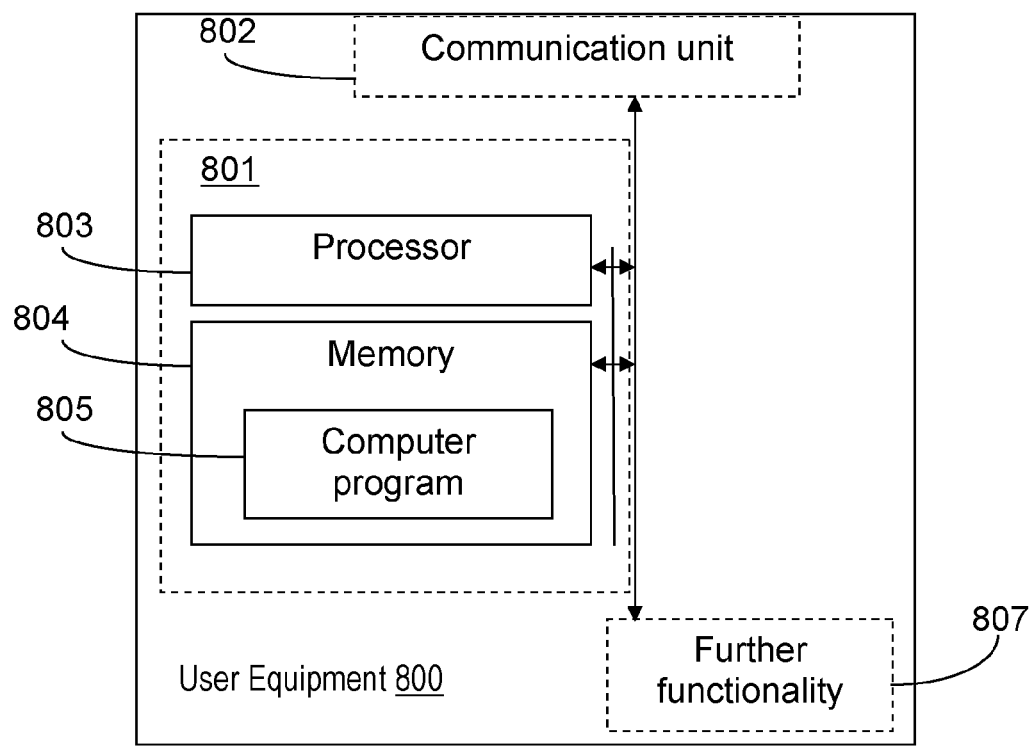
FIGS. 8 and 9 are block charts, illustrating a wireless device, according to different exemplifying embodiments.

Exemplifying Wireless Device, FIG. 8

Embodiments described herein also relate to a wireless device operable in a wireless communication system allowing D2D communication. The wireless device is adapted to perform at least one embodiment of the method described above. The wireless device is associated with the same technical features, objects and advantages as the method described above. The wireless device may be e.g. a UE, such as an LTE UE, a sensor, an actuator, a communication device, a tablet, a computer or any other device capable of wireless communication and operable in the wireless communication system, such as an LTE-type system, a WCDMA system or a multi-RAT (radio access technology) system. The wireless device will be described in brief in order to avoid unnecessary repetition.

Below, an exemplifying wireless device 800, adapted to enable the performance of the above described procedure performed by a wireless device, will be described with reference to FIG. 8.

The part of the wireless device which is mostly related to the herein suggested solution is illustrated as an arrangement 801 surrounded by a broken/dashed line. The arrangement 801 and possibly other parts of the wireless device 800 are adapted to enable the performance of one or more of the methods or procedures described above and illustrated e.g. in FIG. 4.

The wireless device 800 illustrated in FIG. 8 comprises processing means, in this example in form of a processor 803 and a memory 804, wherein said memory is containing instructions 805 executable by said processor, whereby the wireless device is operative to perform the method described above. That is, the execution of the instruction renders the wireless device operative to receive an indication, from a base station, of downlink transmission resources that are associated with D2D communication in a cell associated with the BS during at least a time period T. The wireless device is further rendered operative to determine, based on the received indication, downlink reference signals that may be subjected to interference, caused by D2D communication, when performing reference signal measurements during at least the time period T. The wireless device is further rendered operative to exclude or reduce the influence of said downlink reference signals when performing reference signal measurements during at least the time period T.

The received indication may indicate transmission resources which are associated with at least one of: D2D communication with a maximum allowed transmit power which exceeds a threshold; D2D communication using a transmit power which exceeds a threshold; any D2D communication; and D2D communication in a certain part of a cell.

The indication may be received via one of: PDCCH signaling; RRC signaling; and/or broadcast signaling.

The wireless device may further be rendered operative to receive, from the BS, an indication of one or more of: the time period T; the maximum transmit power allowed to be used for D2D communication by each pair of devices engaged in D2D communication, resources that are associated with multiple pairs of devices engaged in D2D communication; a type of reference signal that is protected from D2D interference; and/or a type of reference signal that should be excluded or be given reduced influence during channel measurements.

The wireless device 800 is illustrated as to communicate with other entities via a communication unit 802, which may be considered to comprise conventional means for wireless and/or wired communication in accordance with a communication standard within which the base station is operable. The arrangement and/or wireless device may further comprise other functional units 807, for providing e.g. regular wireless device functions, such as e.g. signal processing, coding and user interaction.

Figure 9:
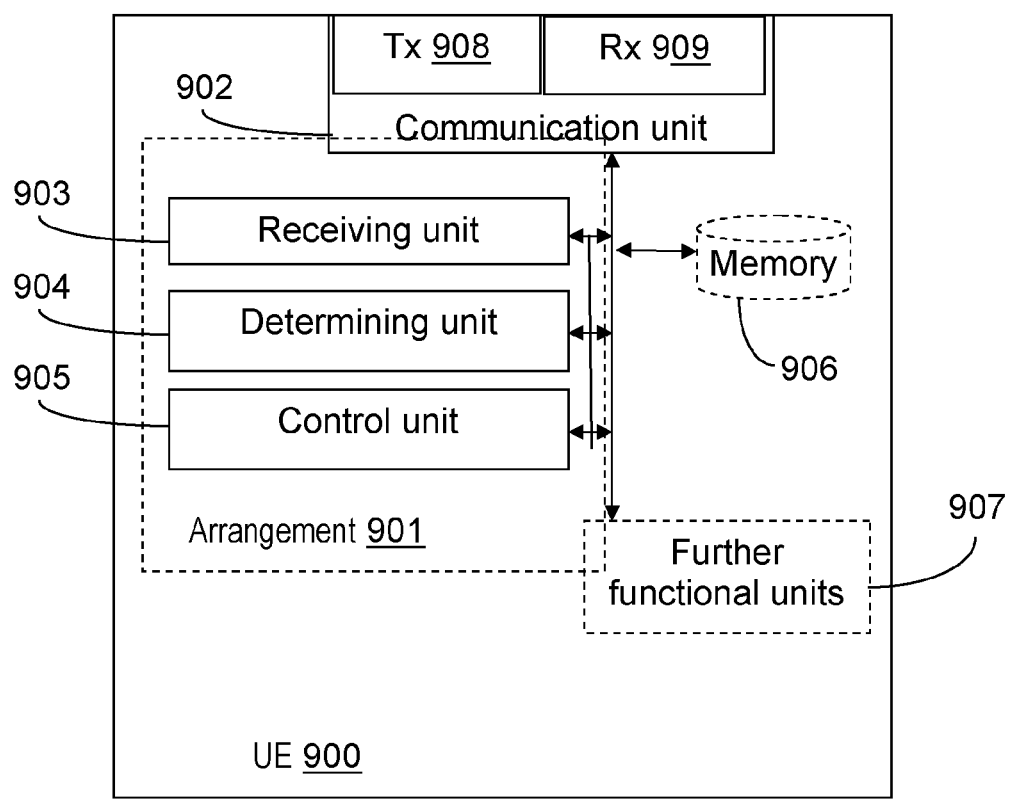

The arrangement 801 may alternatively be implemented and/or schematically described as illustrated in FIG. 9. The arrangement 901 comprises a receiving unit 903 for receiving an indication from a base station, of downlink transmission resources that are associated with D2D communication in a cell associated with the BS during at least a time period T. The arrangement further comprises a determining unit 904 for determining, based on the received indication, downlink reference signals that may be subjected to interference from D2D communication when performing reference signal measurements during at least the time period T; and a control unit 905 for excluding or reducing the influence of said downlink reference signals when performing reference signal measurements during at least the time period T.

The arrangement 901, and other parts of the wireless device could be implemented e.g. by one or more of: a processor or a micro processor and adequate software and storage therefore, a Programmable Logic Device (PLD) or other electronic component(s)/processing circuit(s) configured to perform the actions mentioned above.

It is to be understood that the choice of interacting units or modules, as well as the naming of the units are only for exemplifying purpose, and communication nodes and wireless devices suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

By use of the herein suggested solution, wireless devices could make more accurate measurements/calculations based on reference signals. For example, LTE UEs can more precisely determine the phase reference for data demodulation than without the suggested solution, since with the help of the suggested solution, a UE can know which RS it should include in determining the CSI associated with a given PRB. Further, a wireless device, e.g. UE, can form its channel quality information, CQI, which is fed back to its serving BS, such that it is more resource efficient than without the suggested solution. For example, a UE may decide not to include a given PRB in its CQI feedback when the UE knows that the PRB is contaminated by multiple D2D transmissions, and the base station will not schedule the UE on such a PRB.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the presently described concept, for it to be encompassed hereby.

ABBREVIATIONS

- ABS Almost Blank Sub-frame
- AWGN Additive White Gaussian Noise
- CRS Cell Specific Reference Signal
- CQI Channel Quality Information
- DL Downlink
- DMRS Downlink Modulation Reference Signal
- ICIC Intercell Interference Coordination
- IRC Interference Rejection Combining
- MMSE Minimum Mean Square Error
- SIC Successive Interference Cancellation
- MRC Maximum Ratio Combining
- MU MIMO Multi-User Multiple Input Multiple Output
- D2D Device-to-Device
- OFDM Orthogonal Frequency Division Multiplexing
- PDSCH PHY Downlink Shared Channel
- PRB Physical Resource Block
- RRC Radio Resource Control
- RE Resource Element
- RLM Radio Link Management
- RRM Radio Resource Management
- RX Receive
- RSRP Reference Symbol Received Power
- RSSI Received Signal Strength Indicator
- Tx Transmit
- UE User Equipment
- UL Uplink

The invention claimed is:

1. A system for managing reference signal interference in a wireless communication system allowing device-to-device (D2D) communication, the system comprising a base station (BS) and one or more wireless devices;

wherein the BS comprises processing circuitry configured to:
  determine, for a cell associated with the BS, downlink transmission resources that are to be associated with D2D communication during at least a time period T; and
  to indicate the determined downlink transmission resources to the one or more wireless devices, thus informing the one or more wireless devices of which downlink reference signals that may be subjected to interference caused by D2D communication; and wherein the one or more wireless devices each comprise processing circuitry configured to:
receive an indication, from the BS, of downlink transmission resources that are to be associated with D2D communication in a cell associated with the BS during at least a time period T;
determine, based on the received indication, downlink reference signals that may be subjected to interference from D2D communication when performing reference signal measurements during at least the time period T; and
exclude or reduce an influence of said downlink reference signals when performing reference signal measurements during at least the time period T.

2. A method performed by a base station (BS) for managing reference signal interference in a wireless communication system allowing device-to-device (D2D) communication, the method comprising:
determining, for a cell associated with the BS, downlink transmission resources that are to be associated with D2D communication during at least a time period T;
indicating the determined downlink transmission resources to one or more wireless devices, thus informing the one or more wireless devices of downlink reference signals that may be subjected to interference from D2D communication;
receive an indication, from the BS, of downlink transmission resources that are to be associated with D2D communication in a cell associated with the BS during at least a time period T,
wherein the one or more wireless devices comprise processing circuitry configured to:
  determine, based on the received indication, downlink reference signals that may be subjected to interference from D2D communication when performing reference signal measurement during at least the time period T,
  exclude or reduce an influence of said downlink reference signals when performing reference signal measurement during at least the time period T; and
indicating, to one or more wireless devices not involved in D2D communication, any one or more of:
a maximum transmit power allowed to be used for D2D communication by each pair of devices engaged in D2D communication,
resources that are associated with multiple pairs of devices engaged in D2D communication,
a type of reference signal that is protected from D2D interference, and.

3. The method of claim 2, wherein the wireless communication system is an LTE-type system.

4. The method of claim 2, wherein the downlink transmission resources are indicated as a set of Physical Resource Blocks (PRBs).

5. The method of claim 2, wherein the indicated downlink transmission resources are associated with at least one of:
   D2D communication with a maximum allowed transmit power that exceeds a threshold;
   D2D communication using a transmit power that exceeds a threshold;
   any D2D communication; and
   D2D communication in a certain part of a cell.

6. The method of claim 2, wherein the transmission resources are indicated to the one or more wireless devices via one of:
   downlink physical control channel (PDCCH) signaling;
   radio resource control (RRC) signaling;
   broadcast signaling.

7. The method of claim 2, further comprising:
   indicating the determined transmission resources to a neighboring BS, thus informing the neighboring BS of which downlink reference signals may be subjected to inter cell interference caused by D2D communication.

8. The method of claim 7, wherein the determined transmission resources are indicated to the neighboring BS via an X2 or Si interface.

9. A method, performed by a wireless device, for managing reference signal interference in a wireless communication system allowing device-to-device (D2D) communication, the method comprising:
   receiving an indication from a base station (BS) of downlink transmission resources that are associated with D2D communication in a cell associated with the BS during at least a time period T;
   determining, based on the received indication, downlink reference signals that may be subjected to interference caused by D2D communication when performing reference signal measurements during at least the time period T; and
   excluding or reducing an influence of said downlink reference signals when performing reference signal measurements during at least the time period T.

10. The method of claim 9, wherein the wireless communication system is an LTE-type system.

11. The method of claim 9, wherein the downlink transmission resources are indicated as a set of Physical Resource Blocks (PRBs).

12. The method of claim 9, wherein the received indication indicates transmission resources associated with at least one of:
   D2D communication with a maximum allowed transmit power that exceeds a threshold;
   D2D communication using a transmit power that exceeds a threshold;
   any D2D communication; and
   D2D communication in a certain part of a cell.

13. The method of claim 9, wherein the indication is received via one of:
   downlink physical control channel (PDCCH) signaling;
   radio resource control (RRC) signaling; and
   broadcast signaling.

14. The method of claim 9, further comprising receiving, from the BS, an indication of one or more of:
   the time period T;
   a maximum transmit power allowed to be used for D2D communication by each pair of devices engaged in D2D communication,
   resources that are associated with multiple pairs of devices engaged in D2D communication
   a type of reference signal that is protected from D2D interference; and
   a type of reference signal that should be excluded or be given reduced influence during channel measurements.

15. A base station (BS) operable in a wireless communication system allowing device-to-device (D2D) communication, the BS comprising a processor and a memory, wherein said memory contains instructions executable by said processor whereby the BS is operative to:
   determine downlink transmission resources that are associated with D2D communication in a cell associated with the BS during at least a time period T;
   indicate the determined downlink transmission resources to one or more wireless devices, thus informing the one or more wireless devices of downlink reference signals that may be subjected to interference from D2D communication;
   receive an indication, from the BS, of downlink transmission resources that are to be associated with D2D communication in a cell associated with the BS during at least a time period T,
   wherein the one or more wireless devices comprise processing circuitry configured to:
      determine, based on the received indication, downlink reference signals that may be subjected to interference from D2D communication when performing reference signal measurement during at least the time period T,
      exclude or reduce an influence of said downlink reference signals when performing reference signal measurement during at least the time period T; and
   indicate, to one or more wireless devices not involved in D2D communication, any one or more of:
   the maximum transmit power allowed to be used for D2D communication by each pair of devices engaged in D2D communication,
   resources that are associated with multiple pairs of devices engaged in D2D communication,
   a type of reference signal that is protected from D2D interference, and.

16. The base station of claim 15, wherein the downlink transmission resources are indicated as a set of Physical Resource Blocks (PRBs).

17. The base station of claim 15, wherein the determined downlink transmission resources are associated with at least one of:
   D2D communication with a maximum allowed transmit power which exceeds a threshold;
   D2D communication using a transmit power which exceeds a threshold;
   any D2D communication; and
   D2D communication in a certain part of a cell.

18. The base station of claim 15, wherein the transmission resources are indicated to the one or more wireless devices via one of:
   downlink physical control channel (PDCCH) signaling;
   radio resource control (RRC) signaling; and
   broadcast signaling.

19. The base station of claim 15, being further operative to indicate the determined transmission resources to a neighboring BS, thus informing the neighboring BS of downlink reference signals that may be subjected to inter cell interference caused by D2D communication.

20. The base station of claim 19, wherein the determined transmission resources are indicated to the neighboring BS via an X2 or S1 interface.

21. The base station of claim 15, wherein the BS is at least one of:
a radio base station, an eNB, a NodeB, an access node and a relay.

22. A wireless device operable in a wireless communication system allowing device-to-device (D2D) communication, the wireless device comprising a processor and a memory, wherein the memory contains instructions executable by said processor whereby the wireless device is operative to:
receive an indication from a base station (BS) of downlink transmission resources that are to be associated with D2D communication in a cell associated with the BS during at least a time period T;
determine, based on the received indication, downlink reference signals that may be subjected to interference from D2D communication when performing reference signal measurements during at least the time period T; and
exclude or reduce an influence of said downlink reference signals when performing reference signal measurements during at least the time period T.

23. The wireless device of claim 22, wherein the received indication indicates transmission resources associated with at least one of:
D2D communication with a maximum allowed transmit power that exceeds a threshold;
D2D communication using a transmit power that exceeds a threshold;
any D2D communication; and
D2D communication in a certain part of a cell.

24. The wireless device of claim 22, wherein the indication is received via one of:
downlink physical control channel (PDCCH) signaling;
radio resource control (RRC) signaling; and
broadcast signaling.

25. The wireless device of claim 22, being further operative to receive, from the BS, an indication of one or more of:
the time period T;
a maximum transmit power allowed to be used for D2D communication by each pair of devices engaged in D2D communication;
resources that are associated with multiple pairs of devices engaged in D2D communication;
a type of reference signal that is protected from D2D interference;
a type of reference signal that should be excluded or be given reduced influence during channel measurements.

26. The wireless device of claim 22, wherein the wireless device is at least one of: a user equipment, a communication device, a sensor, an actuator, a tablet, a computer, and a device capable of wireless communication.

27. A method performed by a base station (BS) for managing reference signal interference in a wireless communication system allowing device-to-device (D2D) communication, the method comprising:
determining, for a cell associated with the BS, downlink transmission resources that are to be associated with D2D communication during at least a time period T that is longer than an interval at which link level assignments for non-D2D communications in the wireless communication system are made;
indicating the determined transmission resources to one or more wireless devices, thus informing the one or more wireless devices of downlink reference signals that may be subjected to interference from D2D communication; and
indicating, to the one or more wireless devices, any one or more of:
the time period T,
a maximum transmit power allowed to be used for D2D communication by each pair of devices engaged in D2D communication,
resources that are associated with multiple pairs of devices engaged in D2D communication,
a type of reference signal that is protected from D2D interference, and
a type of reference signal that should be excluded or be given reduced influence during channel measurements.

* * * * *